July 4, 1961 G. BAHUS, JR 2,991,346
APPARATUS FOR DRYING ELECTRICAL INSTALLATIONS
Filed Sept. 9, 1959
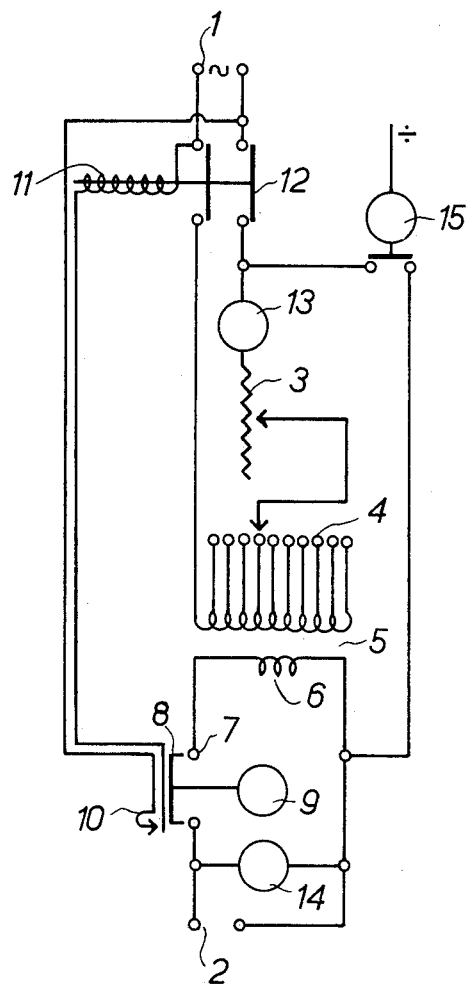
INVENTOR:
GUSTAV BAHUS jr.
BY Richards & Geier
ATTORNEYS

# United States Patent Office 2,991,346
Patented July 4, 1961

2,991,346
APPARATUS FOR DRYING ELECTRICAL
INSTALLATIONS
Gustav Bahus, Jr., 47 Nygaardsgatan, Bergen, Norway
Filed Sept. 9, 1959, Ser. No. 838,910
2 Claims. (Cl. 219—19)

In electrical installations, particularly on board ship, the problem often arises that the insulating property of different layers of insulation in such installations varies according to the moisture content thereof and the resistance to current losses may decrease to extremely low values as a consequence of condensation or direct leakage of water into the layers of insulation. Drying of such layers of insulation may be very difficult, particularly in stationary installations, such as electric motors on board ship. Often, the entire installation must be removed for drying in drying ovens, involving the disadvantage that the layers of insulation must be dried from the outside and inwardly. This may even prevent full drying of the entire cross section of the insulation.

This invention has for an object to avoid the above mentioned disadvantages and to provide a method and apparatus for drying such installations in an easy and effective manner, without removal of the installation.

According to one aspect of this invention, there is provided a method for drying electrical installations, such method comprising connecting the circuit of the installation to be dried in series with a conductor member having substantially the same conducting and heat generating properties as the conducting wiring parts of the circuit, applying a voltage to the series circuit so formed, measuring the generation of heat at said conductor member, and so regulating the magnitude of said voltage in dependence on the heating of the wiring of the series circuit that the temperature is maintained at a level which causes evaporation of moisture from such circuit, but is below the upper critical limit of temperature of the installation.

According to a further aspect of this invention there is provided an apparatus for use in drying electrical installations, such apparatus comprising a casing carrying circuitry which includes a first set of terminals for connecting the said circuitry to a source of electricity, a second set of terminals for connecting the said circuitry to the circuit of the installation to be dried, a conductor member having electrical properties, as regards its heating by different voltage values, corresponding to the wiring of the circuit of the installation to be dried, said conductor member being connected across a third set of terminals, a voltage regulating transformer having its primary winding connected across said first set of terminals and its secondary winding connected between a first terminal of said second set and a first terminal of said third set, an electrical connection between the second terminals of said second and third sets of terminals, means for controlling the heat generated in said conductor member by the current passing therethrough in series with the circuit to be dried, and means for adjusting the voltage of the supply to said primary winding so that said generated heat approaches, but remains below, a predetermined critical upper limit of temperature, such upper limit corresponding to the limit for safe heating of the circuit to be dried.

Preferably, said third set of terminals comprises clip means for interchangeably receiving a selected one of a series of conductor members, said series comprising wiring members of conventional cross-sectional dimensions corresponding to the standard dimensions employed in stationary installations of the type with which the apparatus is designed to be used.

In order that this invention may more readily be understood and further features thereof appreciated, reference will now be made by way of example to the accompanying drawings in which the only figure illustrates diagrammatically the circuitry of a preferred form of apparatus for use in carrying out the method according to this invention when drying electrical installations. This apparatus may advantageously be used for drying stationary installations, for example stator windings of electric motors of submarine vessels.

In submarine vessels, the motors thereof are particularly susceptible to moisture penetration which results in the short-circuiting of the electrical insulation between conducting parts of the motors. In addition to the disadvantage arising as a result of such short-circuiting, such moisture penetration is extremely inconvenient for the further reason that the motors are, due to the limited space available in submarine vessels, usually arranged in locations entirely inaccessible for inspection and repair. Heretofore, it has been necessary to remove such motors for drying ashore, such removal being extremely difficult, however, as a result of the inaccessibility of the motors.

In the illustrated apparatus, which is preferably constructed to be transportable, reference numeral 1 designates terminals for coupling the apparatus to a source of electricity, for example the conventional main supply, whilst reference numeral 2 designates terminals for coupling the apparatus into a circuit of the instalaltion to be dried, e.g. one of the stator windings of a motor. The constant voltage of the electricity source applied to the terminals 1 may within the apparatus be regulated to the desired value by means of a variable resistor 3 interposed between one of the terminals 1 and any one of a number of different connections 4 of the primary winding of a transformer 5, the said primary winding being connected as shown across the terminals 1, whilst the secondary winding 6 of transformer 5 is connected across the terminals 2. The connection between the secondary winding 6 and one of the terminals 2 is made via a mounting 7 for a replaceable insert 8 the temperature of which is measured by a thermometer, indicated diagrammatically at 9. The mounting 7 comprises a pair of terminals of clip form so that insert 8 may be readily and removably coupled thereto. Furthermore, this insert 8 is associated with a thermostatically controlled switch 10 by means of which current is supplied to a winding 11 of a contact switch 12 arranged to open the supply circuit to the primary winding should the temperature of the output circuit from the secondary winding rise to a dangerous value.

In addition, an ammeter 13 is included in the supply circuit to the primary winding of the transformer 5 for measuring the value of the current in this circuit; a voltmeter 14 is coupled across the terminals 2 for measuring the voltage of the output of the secondary winding 6; and an ohmmeter 15 is connected as shown for measuring the insulation resistance to earth of both the supply circuit to the primary winding of the transformer 5 and the output circuit from the secondary winding 6 of this transformer.

In carrying out the method according to this invention using the illustrated apparatus, the terminals 1 are connected to an electricity supply and the terminals 2 are connected to the circuit to be dried. An insert 8 is mounted at 7, such insert being selected so that it will correspond in its electrical properties, particularly its heat generation property when passing a predetermined current, to the wiring of the circuit to be dried. For use with conventional installations, a standard series of inserts corresponding to the standard series of conductor wires for such installations may be provided. The voltage across the terminals 2 is regulated so as to give a heating effect which is somewhat below the critical upper limit of temperature of the installation, said temperature being measured by means of the thermometer 9.

Generally, the circuit connected to the terminals 2 must be subjected to a relatively high overload, this being without danger, however, as a high degree of current losses through the damp insulation will occur. As the insulation dries out, the voltage must be decreased in order that the installation should not be unduly heated, the regulation of this voltage being achieved by reading the thermometer 9 and making appropriate adjustment of the variable resistor 3 and its coupling to the connections 4.

Unless a complete breakdown of the insulation has occurred, a full drying of the windings may be effected by using the method and apparatus above described. It will be appreciated that complete breakdown of the insulation in permanent installation, such as the windings of motors of submarine vessels, very seldom occurs.

The apparatus described may also, of course, be used for drying the insulation of other stationary installations, and is particularly useful where such installations are not conveniently accessible for maintenance. It has been found that the penetration of moisture is usually the main source of a decrease in the insulation resistance of such installations, complete breakdown of the insulation occurring extremely rarely.

What I claim is:

1. An apparatus for drying electrical installation, said apparatus comprising, in combination with a replaceable insert the electrical heating properties of which correspond to those of the wiring of the installation to be dried; a set of current-receiving terminals, a set of current-transmitting terminals, a third set of terminals for receiving said replaceable insert, a transformer having a primary winding and a secondary winding, a contact switch opening and closing said current-receiving terminals, means operatively connecting said contact switch with the primary winding of said transformer for adjusting the voltage of said primary winding, means operatively connecting said replaceable insert with said contact switch for actuating said contact switch to control the heat generated in said insert, and means interconnecting in series said secondary winding, said current-transmitting terminals and said insert-receiving terminals.

2. Apparatus in accordance with claim 1, comprising a series of interchangeable replaceable inserts having cross-sectional dimensions corresponding to those of the installations to be dried, said insert-receiving terminals consisting of clip means for interchangeably receiving a selected one of said series of inserts.

References Cited in the file of this patent

UNITED STATES PATENTS

| | | |
|---|---|---|
| 1,568,078 | Mabey | Jan. 5, 1926 |
| 2,728,843 | Lightfoot | Dec. 27, 1955 |